United States Patent
Morris et al.

(10) Patent No.: US 10,677,995 B2
(45) Date of Patent: Jun. 9, 2020

(54) OPTICAL FIBER INTERFACE FOR OPTICAL DEVICE PACKAGE

(71) Applicant: HEWLETT PACKARD ENTERPRISE DEVELOPMENT LP, Houston, TX (US)

(72) Inventors: Terrel L Morris, Garland, TX (US); Raymond G Beausoleil, Seattle, WA (US); Jason Pelc, Palo Alto, CA (US); Marco Fiorentino, Mountain View, CA (US); Charles M Santori, Palo Alto, CA (US); Michael W Cumbie, Albany, OR (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/520,829

(22) PCT Filed: Oct. 23, 2014

(86) PCT No.: PCT/US2014/061960
§ 371 (c)(1),
(2) Date: Apr. 20, 2017

(87) PCT Pub. No.: WO2016/064402
PCT Pub. Date: Apr. 28, 2016

(65) Prior Publication Data
US 2017/0315298 A1    Nov. 2, 2017

(51) Int. Cl.
*G02B 6/36* (2006.01)
*G02B 6/42* (2006.01)

(52) U.S. Cl.
CPC .......... *G02B 6/3636* (2013.01); *G02B 6/423* (2013.01); *G02B 6/4249* (2013.01); *G02B 6/4257* (2013.01); *G02B 6/4239* (2013.01)

(58) Field of Classification Search
CPC .... G02B 6/3636; G02B 6/4257; G02B 6/423; G02B 6/4249; G02B 6/4239
See application file for complete search history.

(56) References Cited

U.S. PATENT DOCUMENTS 450,412 A    4/1891  Knight
4,504,121 A  3/1985  Carlsen et al.
(Continued)

FOREIGN PATENT DOCUMENTS

EP    2112790 A1    10/2009
JP    2008-514997 A   5/2008
(Continued)

OTHER PUBLICATIONS

Hunziker, W. et al., Low-loss, Self-aligned Flip-chip Technique for Interchip and Fiber Array to Waveguide Oeic Packaging, 1994, IEEE LEOS, pp. 269-270.
(Continued)

Primary Examiner — Ryan A Lepisto
Assistant Examiner — Erin D Chiem
(74) Attorney, Agent, or Firm — Nolte Intellectual Property Law Group

(57) ABSTRACT

One example includes an optical fiber interface. The interface includes a first substrate comprising a pair of opposing surfaces. The substrate includes an opening extending therethrough that defines an inner periphery. One surface of the opposing surfaces of the first substrate can be configured to be bonded to a given surface of a second substrate. The interface also includes a plurality of optical fibers secured to the other opposing surface of the first substrate and extending inwardly from a plurality of surfaces of the inner periphery at fixed locations to align the set of optical fibers to optical inputs/outputs (I/O) of an optical system chip that
(Continued)

is coupled to the given surface of the second substrate and received through the opening.

20 Claims, 5 Drawing Sheets

(56) References Cited

U.S. PATENT DOCUMENTS

| | | |
|---|---|---|
| 4,988,157 A | 1/1991 | Jackel et al. |
| 5,037,179 A | 8/1991 | Bortolin et al. |
| 5,268,981 A | 12/1993 | Shahid |
| 5,717,803 A | 2/1998 | Yoneda et al. |
| 5,786,560 A | 7/1998 | Tatah et al. |
| 5,960,131 A | 9/1999 | Fouquet et al. |
| 6,055,344 A | 4/2000 | Fouquet et al. |
| 6,134,369 A | 10/2000 | Kurosawa |
| 6,154,586 A | 11/2000 | MacDonald et al. |
| 6,164,837 A | 12/2000 | Haake et al. |
| 6,345,132 B1 | 2/2002 | Picard et al. |
| 6,356,679 B1 | 3/2002 | Kapany |
| 6,366,715 B1 | 4/2002 | Wang |
| 6,374,020 B1 | 4/2002 | Paniccia |
| 6,396,972 B1 | 5/2002 | O'Rourke et al. |
| 6,463,192 B1 | 10/2002 | Kapany |
| 6,487,333 B2 | 11/2002 | Fouquet et al. |
| 6,617,568 B1 | 9/2003 | Matsuda |
| 6,690,845 B1 | 2/2004 | Yoshimura et al. |
| 6,711,315 B1 | 3/2004 | Joseph et al. |
| 6,768,830 B1 | 7/2004 | Lacey et al. |
| 6,882,769 B1 | 4/2005 | Maitan |
| 6,895,139 B2 | 5/2005 | Schwiebert et al. |
| 6,915,032 B1 | 7/2005 | White et al. |
| 7,541,058 B2 | 6/2009 | Chan et al. |
| 7,623,743 B2 | 11/2009 | Furuyama |
| 7,653,272 B2 | 1/2010 | Cham et al. |
| 7,713,767 B2 | 5/2010 | Chan et al. |
| 8,113,724 B2 | 2/2012 | Terada et al. |
| 8,120,450 B2 | 2/2012 | Kondo et al. |
| 8,195,016 B2 | 6/2012 | Shacklette |
| 8,270,792 B1 | 9/2012 | Ng |
| 8,718,436 B2 | 5/2014 | Barnes et al. |
| 9,442,251 B2 | 9/2016 | Sakai et al. |
| 2002/0005574 A1 | 1/2002 | Zhou |
| 2002/0039468 A1 | 4/2002 | Lin |
| 2003/0002030 A1 | 1/2003 | Schroeder |
| 2003/0021551 A1* | 1/2003 | Carpenter ............... B81B 7/007 385/89 |
| 2005/0031265 A1 | 2/2005 | Simon et al. |
| 2005/0276562 A1 | 12/2005 | Battey et al. |
| 2006/0133718 A1 | 6/2006 | Liu |
| 2006/0215954 A1 | 9/2006 | Jenkins et al. |
| 2007/0060970 A1 | 3/2007 | Burdon et al. |
| 2007/0230876 A1 | 10/2007 | Beer et al. |
| 2007/0258683 A1* | 11/2007 | Rolston ................ G02B 6/4232 385/88 |
| 2009/0002849 A1 | 1/2009 | Kim et al. |
| 2009/0028499 A1 | 1/2009 | Maki et al. |
| 2009/0103861 A1 | 4/2009 | Presley et al. |
| 2009/0304331 A1 | 12/2009 | Herman et al. |
| 2010/0178007 A1 | 7/2010 | Thomson et al. |
| 2010/0215317 A1 | 8/2010 | Rolston et al. |
| 2011/0096778 A1 | 4/2011 | Binder |
| 2011/0280534 A1 | 11/2011 | Lin |
| 2012/0039567 A1 | 2/2012 | Herman et al. |
| 2012/0072614 A1 | 3/2012 | Marr et al. |
| 2012/0177381 A1 | 7/2012 | Dobbelaere et al. |
| 2012/0207438 A1 | 8/2012 | Yu et al. |
| 2012/0314382 A1 | 12/2012 | Wesselmann et al. |
| 2012/0321309 A1 | 12/2012 | Barry et al. |
| 2013/0058616 A1 | 3/2013 | Cote et al. |
| 2013/0246990 A1 | 9/2013 | Yen et al. |
| 2014/0112632 A1 | 4/2014 | Keenum et al. |
| 2014/0179034 A1 | 6/2014 | Bartwicz et al. |
| 2014/0193116 A1 | 7/2014 | Bylander et al. |

FOREIGN PATENT DOCUMENTS

| | | |
|---|---|---|
| TW | 201319890 A | 5/2013 |
| WO | 2006/036559 A1 | 4/2006 |
| WO | 2014/088980 A1 | 6/2014 |

OTHER PUBLICATIONS

Ozeptics Company, Polarization Maintaining Fiber Pigtailed V-groove Assemblies [online], Mar. 19, 2002, Retrieved from the Internet <http://www.ozoptics.com/news/pr_113.html> [retrieved on Jul. 31, 2014].

PCT/ISA/KR, International Search Report, dated Jul. 24, 2015, PCT/US2014/061960, 14 pages.

Shi, Y. et al., Fabrication of High Precision Self-aligned V-grooves Integrated on Silica-on-silicon Chips, Jun. 15, 2014, Photonics Technology Letters, IEEE, vol. 26, Issue 12 pp. 1169-1171.

Thomas Meany, "Optical Manufacturing: Femtosecond-Laser Direct-Written Waveguides Produce Quantum Circuits in Glass," Jul. 8, 2014, Laser Focus world. vol. 50, No. 7, 10 pages.

Rebeca Vazquez, "Integration of Femtosecond Laser Written Optical Waveguides in a Lab-on-Chip," Nov. 6, 2008, Lab on a Chip, 2009, vol. 9, pp. 91-96.

Rafael Gattass, "Femtosecond Laser Micromachining in Transparent Materials," (Research Paper), 2008, pp. 219-225. http://www.nature.com/nphoton/journal/v2/n4/full/nphoton 2008, 47 html.

PCT/ISA/KR, International Search Report, dated Jun. 30, 2015, PCT/US2014/061953; 3 pages.

PCT/ISA/KR, International Search Report, dated Jul. 28, 2015, PCT/US2014/062238, 15 pages.

Martynas Beresna, "Ultrafast Laser Direct Writing and Nanostructuring in Transparent Materials," Advances in Optics and Photonics 6.3, Aug. 15, 2014, pp. 293-339, http://www.researchgate.net/profile/Martynas_Bersena/publication/264798279_Ultrafast_leser_direct_writing_and_nanostructuring_in_transparent_materials/links/543400130ct2bf11127ae81pdf.

Intenational Search Report & Written Opinion received in PCT Application No. PCT/US2015/013306, dated Oct. 26, 2015, 12 pages.

Huan Huang, "Femtosecond Fiber Laser Direct Writing of Optical Waveguide in Glasses," SPIE Optical Engineering+Applications, International Spciety for Optics and Photonics 2011 8 pages http://www.polaronyx.com/publictions/Femstosecond_fiber_Jaser_direct_writng_in_glasses.pdf.

Graham Marshall, "Laser Written Waveguide Photonic Quantum Circuits," Optics Express 17.15, Jul. 20, 2009, pp. 12546-12554, http://web.science.mq.edl.au/~graham/publications/articles/marshall_oe_17-15_12546_2009.pdf.

Amphenol Corporation, Fiber Management System, retrieved from Internet Jul. 30, 2014, 22 pages, <http://www.amphenol-fiberoptics.com/assets/page/2f41ec14dbbbb8fb01576a89c8132509/Fiber%20Managaement%20Catalog.pdf>.

* cited by examiner

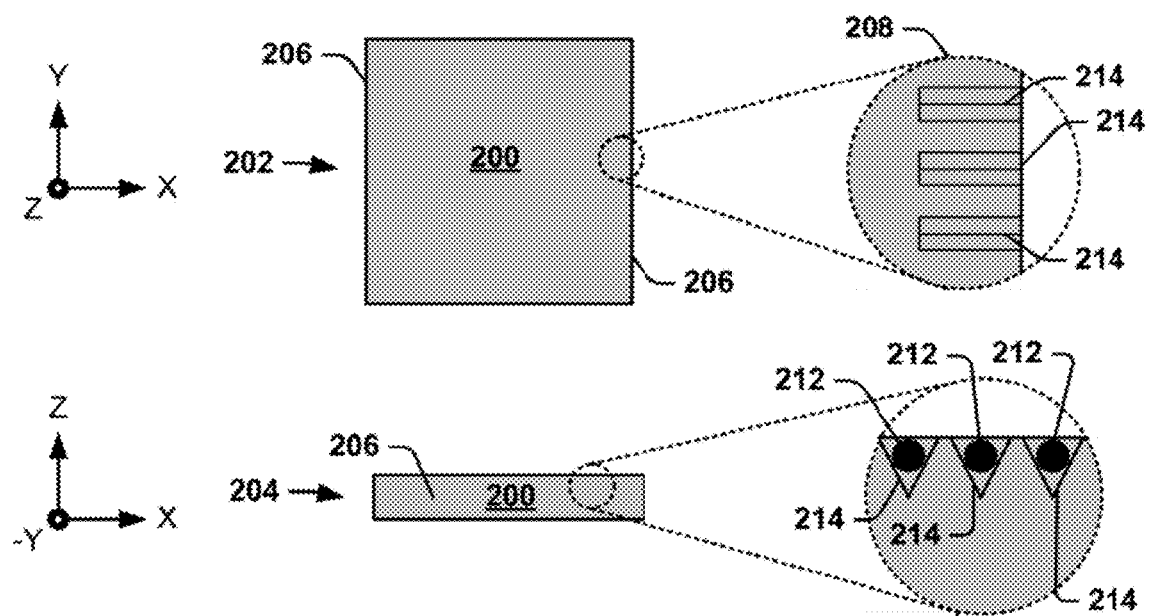
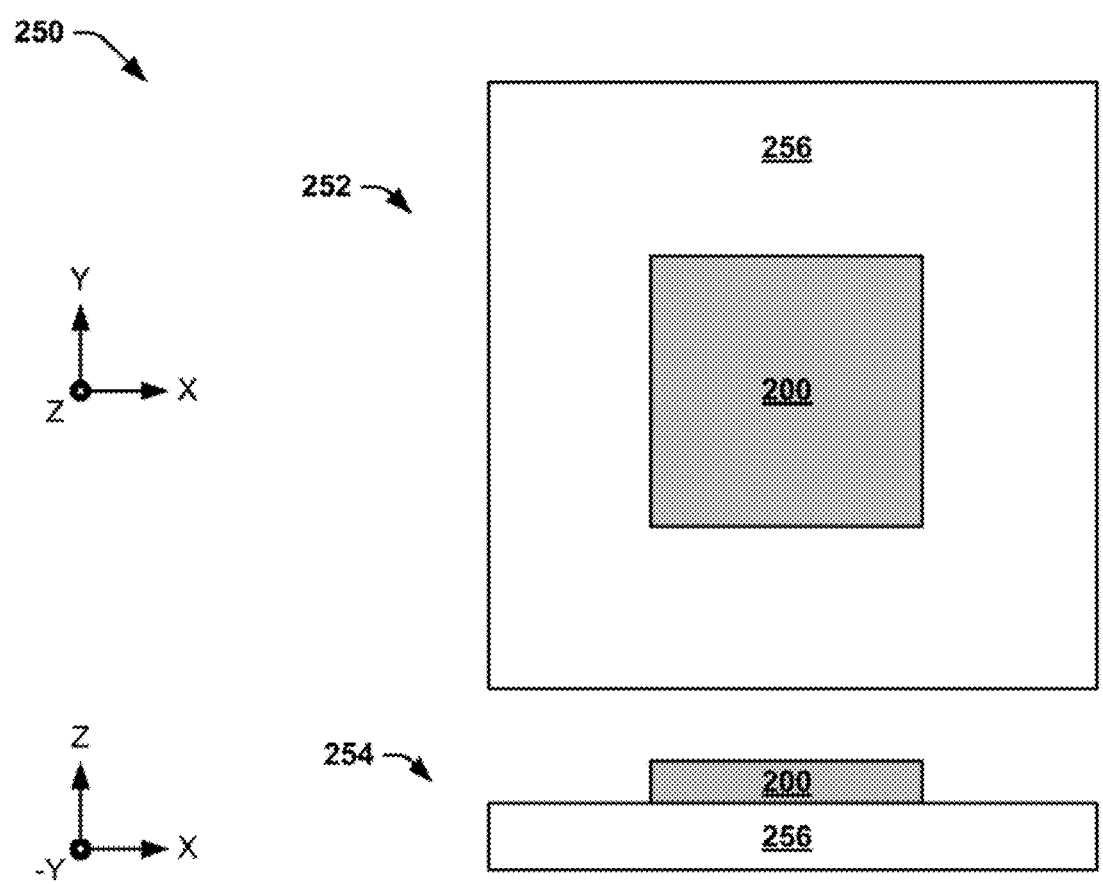
FIG. 5
FIG. 6

OPTICAL FIBER INTERFACE FOR OPTICAL DEVICE PACKAGE

BACKGROUND

Optical communications have become more prevalent as the demand for high-speed communication and processing has increased. Optical communications typically implement a laser and/or other optical devices for providing and receiving optical signals that are carried on optical fibers or other optical waveguides. Attaching optical fibers to a silicon die that is adequately packaged can be difficult, especially for stacked dies and/or for dies that require large numbers of optical fibers (e.g., tens to hundreds of optical fibers.

BRIEF DESCRIPTION OF THE DRAWINGS

FIG. 5 illustrates an example of an optical system chip.

FIG. 6 illustrates an example of an optical system chip assembly.

DETAILED DESCRIPTION

Figure 1:
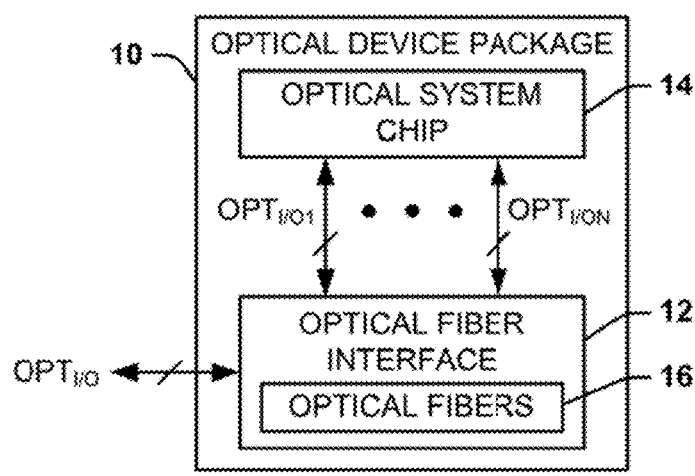
FIG. 1 illustrates an example diagram of an optical device package.

FIG. 1 is a block diagram illustrating an example of an optical device package 10. The optical device package 10 can be designed to operate in a variety of electro-optical computing and/or communications systems that implement the transfer of optical signals as inputs and outputs with respect to the optical device package 10. The optical device package 10 transmits and/or receives a plurality of optical input/output (I/O) signals, demonstrated in the example of FIG. 1 as $OPT_{I/O}$.

The optical device package 10 includes an optical fiber interface 12 and an optical system chip 14. As an example, the optical fiber interface 12 and the optical system chip 14 can each be mounted to the same electrical substrate, such as connected to a surface of a printed circuit board or other structure. The optical fiber interface 12 is configured as an optical fiber interconnect to the optical system chip 14, such that the optical I/O signals $OPT_{I/O}$ can be provided to and/or from the optical system chip 14 via the optical fiber interface 12. As an example, the optical fiber interface 12 can substantially surround the optical system chip 14 to provide the optical I/O signals $OPT_{I/O}$ to and/or from the optical system chip 12 via optical fibers in each of a plurality of peripheral surfaces of the optical system chip 14.

As used herein, "substantially surround" refers the relative position of the optical fiber interface with respect to the optical system chip 14 within the package 10, wherein an inner peripheral edge of the interface extends along more than one outer peripheral edge of the optical system chip. In some examples, the inner peripheral edge of the interface 12 provides a frame that completely surrounds and is adjacent the entire outer peripheral edge of the optical system chip 14.

In the example of FIG. 1, the optical fiber interface 12 includes a set of optical fibers 16 that provide the optical I/O signals $OPT_{I/O}$ to and/or from the optical system chip 14. The set of optical fibers 16 can extend between and beyond an outer periphery of the optical fiber interface 12 and an inner periphery of the optical interface 12, such that the optical fibers 16 are aligned in a fixed position with respect to the optical fiber interface 12. For example, the optical fiber interface 12 can include a substrate on which the optical fibers 16 can be arranged on a top surface thereof, such that a molded material can be disposed on the optical fibers 16 and the top surface. Therefore, all of the optical fibers 16 can be locked into a desired alignment position and angle, and can be protected from damage in the assembly of the optical device package 10. Additionally, the optical I/O signals $OPT_{I/O}$ can be provided from optical signals that are coupled to the optical fibers 16 (e.g., via optical connectors) or can be provided directly on the optical fibers 16 from an external source/destination to which the optical fibers 16 are coupled.

In the example of FIG. 1, the optical system chip 14 is demonstrated as transmitting and/or receiving separate sets of optical signals $OPT_{I/O1}$ through $OPT_{I/ON}$ that can collectively correspond to the optical I/O signals $OPT_{I/O}$ provided to/from the optical system chip 14 at separate peripheral surfaces of the optical device chip 14. As an example, and as disclosed herein, the optical device package 10 can be fabricated in two portions separately, the optical fiber interface 12 and the optical system chip 14, that are subsequently combined to form the optical device package 10. During the combination of the optical fiber interface 12 and the optical system chip 14, the optical fibers 16 can be substantially simultaneously aligned with optical I/O associated with the optical system chip 14. Therefore, the fabrication process of the optical device package 10 and the resulting configuration of the package allow for coupling and alignment of large numbers (e.g., tens to hundreds) of the optical fibers 16 (e.g., corresponding to optical I/O) to the optical system chip 14 concurrently, as opposed to small bundles of fiber at a time. Furthermore, the process of fabricating the optical device package 10 as the two separate portions (e.g., the optical fiber interconnect 12 and the optical system chip 14), then combining the two portions to form the aggregate optical device package 10 can facilitate high-volume manufacturing of chip-package-optics assemblies through mass fiber termination.

Figure 2:
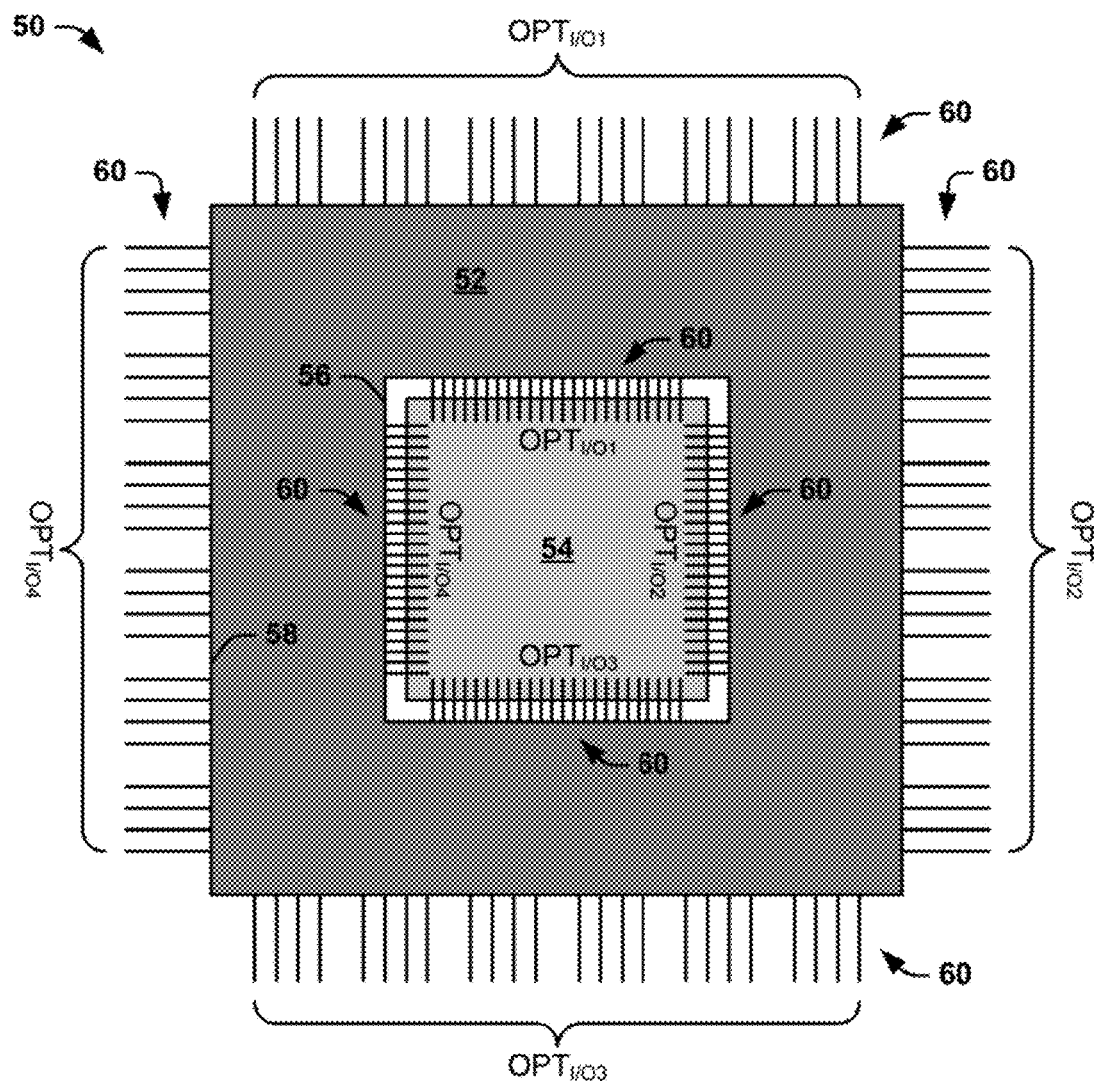
FIG. 2 illustrates an example of an optical device package.

FIG. 2 illustrates an example of an optical device package 50 (e.g., corresponding to optical device package 10 of FIG. 1). The optical device package 50 can be configured in a variety of electro-optical computing and/or communications systems that implement the transfer of optical signals, demonstrated in the example of FIG. 2 as multiple sets of optical I/O signals $OPT_{I/O1}$, $OPT_{I/O2}$, $OPT_{I/O3}$, and $OPT_{I/O4}$, as inputs and/or outputs to the optical device package 50. In the example of FIG. 2, the optical device package 50 is demonstrated in a plan (e.g., top) view.

The optical device package 50 includes an optical fiber interface 52 and an optical system chip 54. The optical system chip 54 can be configured as an optical die that can generate, route, and/or process the optical I/O signals $OPT_{I/O1}$, $OPT_{I/O2}$, $OPT_{I/O3}$, and $OPT_{I/O4}$. As an example, the optical fiber interface 52 and the optical system chip 54 can each be mounted to the same electrical substrate, such as bonded to a printed circuit board or other surface. The optical fiber interface 52 is configured as an optical fiber interconnect to the optical system chip 54, such that the optical I/O signals $OPT_{I/O1}$, $OPT_{I/O2}$, $OPT_{I/O3}$, and $OPT_{I/O4}$ can be provided to and/or from the optical system chip 54 via the optical fiber interface 52.

In the example of FIG. 2, the optical fiber interface 52 substantially surrounds the optical system chip 54, such that the optical fiber interface 52 is arranged as a square ring structure that includes an inner periphery 56 and an outer periphery 58. The optical fiber interface 52 also includes sets of optical fibers 60 that can provide the optical I/O signals $OPT_{I/O1}$, $OPT_{I/O2}$, $OPT_{I/O3}$, and $OPT_{I/O4}$ to and/or from the optical system chip 54. The sets of optical fibers 60 extend between and beyond the inner periphery 56 and the outer periphery 58 of the optical fiber interface 52, such that the optical fibers 60 are fixed in position in the optical fiber interface 52.

In the example of FIG. 2, the sets of optical fibers 60 are arranged such that the lateral spacing between adjacent pairs of optical fibers is greater at the outer periphery 58 relative to the inner periphery 56 to provide for a more compact arrangement of the optical device package 50 and for greater ease in routing the optical fibers 60 from the outer periphery 58 of the optical fiber interface 52. As an example, the optical I/O signals $OPT_{I/O}$ can be provided from optical signals that are coupled to the optical fibers 60 (e.g., via optical connectors) or can be provided directly on the optical fibers 60 from an external source/destination to which the optical fibers 60 are coupled.

In the example of FIG. 2, the optical system chip 54 is demonstrated as transmitting and/or receiving the optical I/O signals $OPT_{I/O1}$, $OPT_{I/O2}$, $OPT_{I/O3}$, and $OPT_{I/O4}$ at separate peripheral surfaces of the optical device chip 54. The optical fibers 60 extend from the inner periphery 56 of the optical fiber interface 52 to the optical system chip 54 aligned with optical inputs and/or outputs (I/O) of the optical system chip 54. For example, a top surface of the optical system chip 54 can include channels (e.g., V-grooves) extending from an outer peripheral edge of the chip housing a predetermined distance to provide an alignment mechanism to connect the optical fibers 60 with the optical I/O of the optical system chip 54, such as during a fabrication procedure. As described herein, the term "channels" can refer to V-grooves or other types of channels formed in the package having one of a variety of other cross-sectional shapes (e.g., including U-shaped or non-symmetric channels) to receive the optical fibers (e.g., the optical fibers 60). For instance, the optical fibers 60 extending inwardly from the inner peripheral surface 56 can be arranged to align with and be received in the channels. Therefore, the optical fibers 60 can be aligned with and optically connected with the optical I/O concurrently during fabrication by connecting the optical fiber interface 52 with the optical chip 54.

Figure 3:
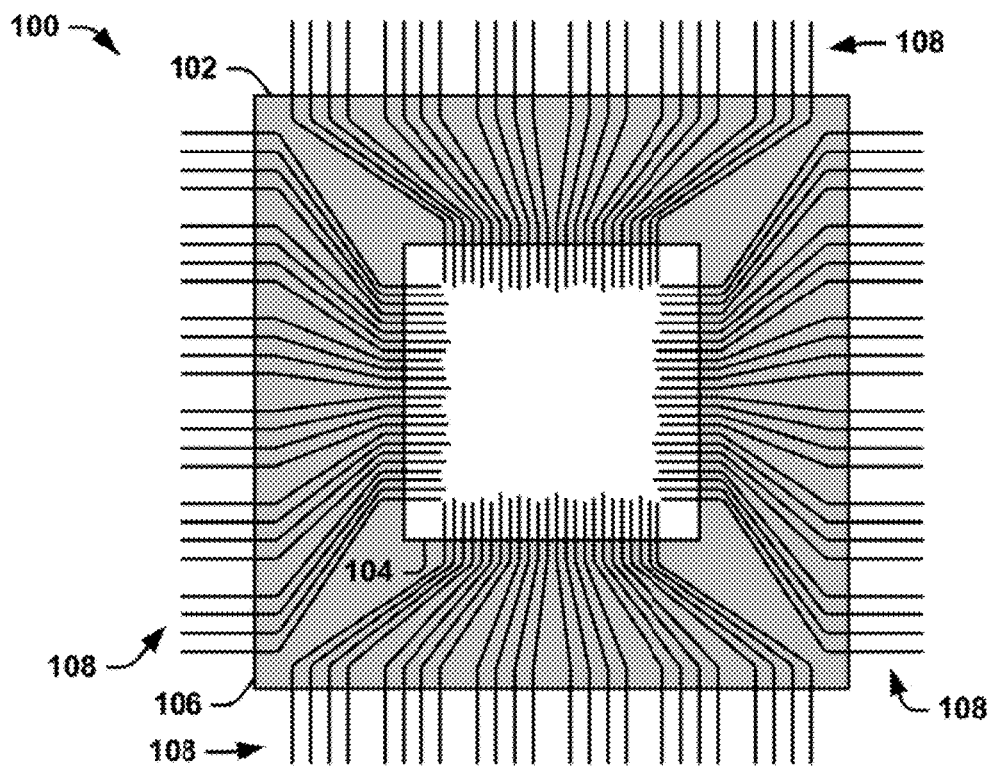
FIG. 3 illustrates an example of an optical fiber interface at an intermediate step in fabricating an optical device package.

As described previously, the optical device package 50 can be fabricated in two portions separately, with the first portion corresponding to the optical fiber interface 52 and the second portion corresponding to the optical system chip 54. FIG. 3 illustrates a diagram 100 of the optical fiber interface (e.g., interface 12 or 52) at an intermediate step in fabricating an optical fiber interface for an optical device package. The diagram 100 can correspond to a step for fabricating the optical fiber interface 52 in the example of FIG. 2. Therefore, reference is to be made to the example of FIG. 2 in the following description of the example of FIG. 3.

The diagram 100 includes a first substrate 102 that has a footprint that approximates the optical fiber interface 52. In the example of FIG. 3, the first substrate 102 is arranged as having a rectangular ring-shape with an inner rectangular periphery 104 that is spaced apart from an outer periphery 106 by the substrate 102. While the first substrate 102 is demonstrated as square-shaped, it is to be understood that the first substrate 102, and thus the resulting optical fiber interface 52, can have other shapes including inner and outer peripheries, such as a rectangular shape or a U-shape as well as include curved surfaces instead of straight. Similar to as described previously in the example of FIG. 2, the first substrate 102 is demonstrated in a plan (i.e., top) view.

The diagram 100 demonstrates a plurality of optical fibers 108 that are disposed on a top-surface of the first substrate 102. The optical fibers 108 are arranged on the top-surface of the first substrate 102 to extend between and beyond the inner periphery 104 and the outer periphery 106 of the first substrate 102. As an example, the optical fibers 108 can be disposed on the top-surface of the first substrate 102 at predetermined locations to increase a fiber spacing between each of the optical fibers 108 at the outer periphery 106 relative to the inner periphery 104, thus allowing for a smaller resulting optical device package and with sufficient spacing of the optical fibers 108 at the outer periphery 106 to provide flexibility in routing and/or connecting the optical fibers 108 to other optical devices (not shown). As an example, the relative density of the optical fibers 108 at the inner periphery 104 relative to the increased spacing of the optical fibers 108 at the outer periphery 106 can be a function of fiber pitch.

The optical fibers 108 can be disposed on the top-surface of the first substrate 102 in a variety of ways, such as including automated fiber-routing equipment that routes the optical fibers 108. For example, the optical fibers 108 can be bonded to the first substrate 102 via thermally-activated adhesive, mold features that trap fibers in prescribed channels (e.g., V-grooves), pin fixtures routinely used for fiber harnesses, and/or a variety of other ways to dispose the optical fibers 108 on the top-surface of the first substrate 102. The location of the optical fibers 108 at the inner periphery 106 can be substantially precise and accurate locations to provide for alignment of the optical fibers 108 with the optical I/O of the optical system chip 54, as described herein.

Figure 4:
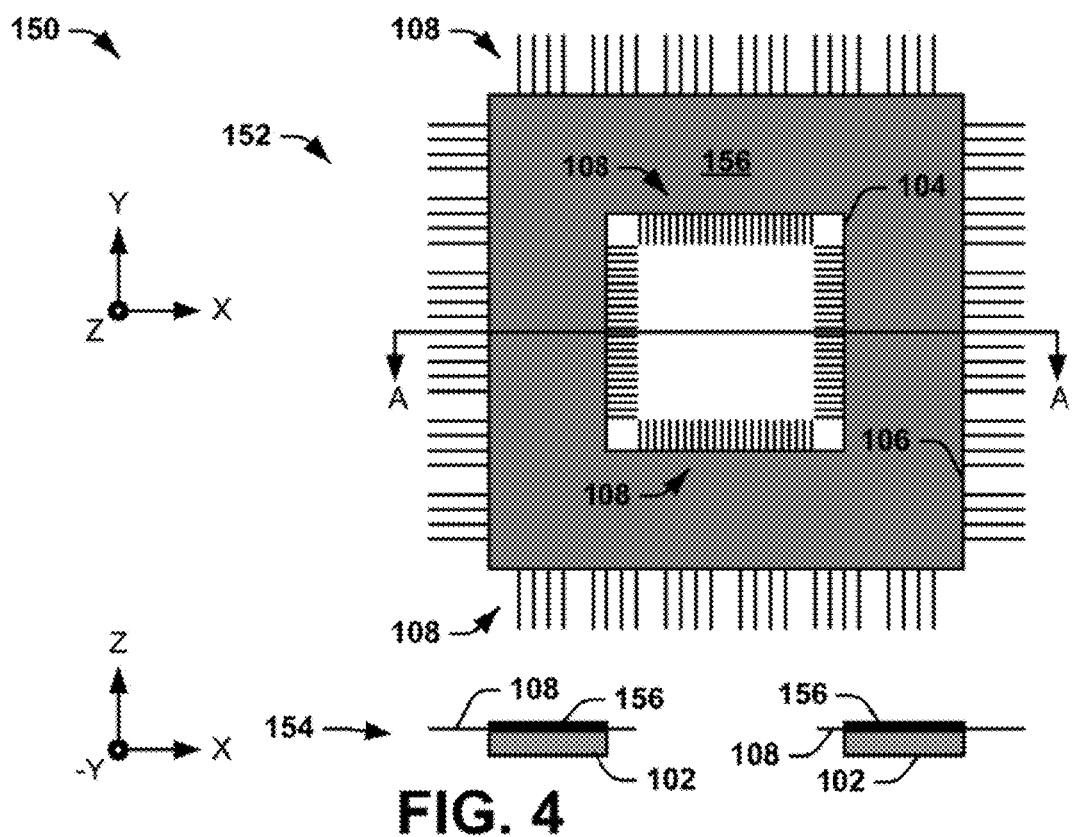
FIG. 4 illustrates an example of an optical fiber interface.

FIG. 4 illustrates an example of an optical fiber interface 150. The optical fiber interface 150 can correspond to the first substrate 102 having undergone further fabrication steps. Therefore, reference is to be made to the example of FIG. 3 in the following description of the example of FIG. 4.

The optical fiber interface 150 is demonstrated in the example of FIG. 4 in two views. Specifically, in the example of FIG. 4, the optical fiber interface 150 is demonstrated in a top plan view at 152 (i.e., in the X-Y plane in three-dimensional Cartesian coordinate space), and is demonstrated in a cross-sectional view along line "A-A" at 154 (i.e., in the X-Z plane in three-dimensional Cartesian coordinate space). As depicted, the optical fiber interface 150 includes the first substrate 102 and the optical fibers 108. In addition, the optical fiber interface 150 includes a molding material 156 disposed on the top-surface of the first substrate 102 (e.g., applied during a fabrication process) to secure the optical fibers 108 in fixed locations between the inner periphery 104 and the outer periphery 106. The molding material 156 can be any of a variety of molding materials that can protect and secure the optical fibers 108 to the top-surface of the first substrate 102 while also holding requisite positional tolerances and providing sufficient package flatness and rigidity with low weight. For example, the molding material 156 can be a silica-filled mold compound to provide control of Thermal Coefficient of Expansion (TCE) and flatness over a wide range of temperatures. As an example, the molding material 156 can be deposited on to the optical fibers and substrate in an over-molding process.

In addition, the optical fibers 108 are demonstrated as having been trimmed in the example of FIG. 4. As an example, subsequent to the application of the molding material 156, an automated laser fiber strip, cleave, and polish mechanism can be implemented to provide finishing of the ends of the optical fibers 108 extending from the inner periphery 104. As a result, the optical fibers 108 can extend a controlled (e.g., approximately equal) length from the inner peripheral edge of the molding material 156 with respect to each other to facilitate self-alignment of the optical fibers 108 to the optical system chip 54, as described herein. For example, the stripping of the optical fibers 108 can provide for reception of the optical fibers 108 into channels on the optical system chip 54 and treatment of the end-faces of the optical fibers 108 can provide sufficient optical coupling of the optical I/O signals $OPT_{I/O1}$, $OPT_{I/O2}$, $OPT_{I/O3}$, and $OPT_{I/O4}$ into the optical I/O of the optical system chip 54. The example of FIG. 4 thus demonstrates a finished optical fiber interface 150 that can be the first portion of the optical system package 50 in the example of FIG. 2.

FIG. 5 illustrates an example of an optical system chip 200 that can correspond to the second portion of the optical system package 50. The optical system chip 200 is demonstrated in the example of FIG. 5 in two views. Specifically, in the example of FIG. 5, the optical system chip 200 is demonstrated in a top view at 202 (i.e., in the X-Y plane in three-dimensional Cartesian coordinate space), and is demonstrated in a side view at 204 (i.e., in the X-Z plane in three-dimensional Cartesian coordinate space). The optical system chip 200 includes a peripheral edge 206. In the example of FIG. 5, details of the peripheral edge 206 is also demonstrated in a first exploded view 208 associated with the top view 202 and a second exploded view 210 associated with the side view 204.

A plurality of optical ports 212 are arranged as inset from the peripheral surface 206. The optical ports 212 can correspond to optical I/O ports of the optical system chip 200, and are thus intended to be optically aligned with the optical fibers 108. In the example of FIG. 5, a plurality of channels 214 are formed (e.g., etched) in the top surface of the optical system chip 200 to extend transversely from the peripheral edge 206 to terminate in an end that is spaced a predetermined distance from the edge. In the example of FIG. 5, the channels 214 are demonstrated as V-grooves. The termination end includes respective optical ports 212, such that the channels 214 are each associated with a respective one of a plurality of optical ports 212. Thus, each of the channels 214 can receive a respective one of the optical fibers 108 to provide the sufficient optical alignment of the optical fibers 108 with the respective optical ports 212. Accordingly, the inclusion of the channels 214 can provide self-alignment capability of the optical fibers 108 with the optical ports 212 when the optical fiber interface 150 is combined with the optical system chip 200 to provide the optical device package 50.

FIG. 6 illustrates an example of an optical system chip assembly 250. The optical system chip assembly 250 is demonstrated in the example of FIG. 6 in two views. In the example of FIG. 6, the optical system chip 250 is demonstrated in a plan view at 252 (i.e., in the X-Y plane in three-dimensional Cartesian coordinate space), and is demonstrated in a side view at 254 (i.e., in the X-Z plane in three-dimensional Cartesian coordinate space). The optical system chip assembly 250 can correspond to an assembly that includes the optical system chip 200 and a second substrate 256.

As an example, the second substrate 256 can have a footprint that has outer peripheral dimensions that are approximately equal to (e.g., slightly less than) the dimensions of the outer periphery 106 of the optical fiber interface 150. The optical system chip 200 is demonstrated as coupled to an approximate center of the second substrate 256. The optical system chip 200 is sized such that the chip can be provided to extend within the opening that is defined by the inner periphery 104 of the optical fiber interface 150, such as disclosed herein. As an example, the second substrate 256 can be an electrical substrate, such as including traces, vias, and/or other conductors therein to conduct electrical signals. Therefore, the optical system chip 200 can be electrically coupled to the second substrate 256, such as via pins, solder, or a variety of other electrical connections.

Figure 7:
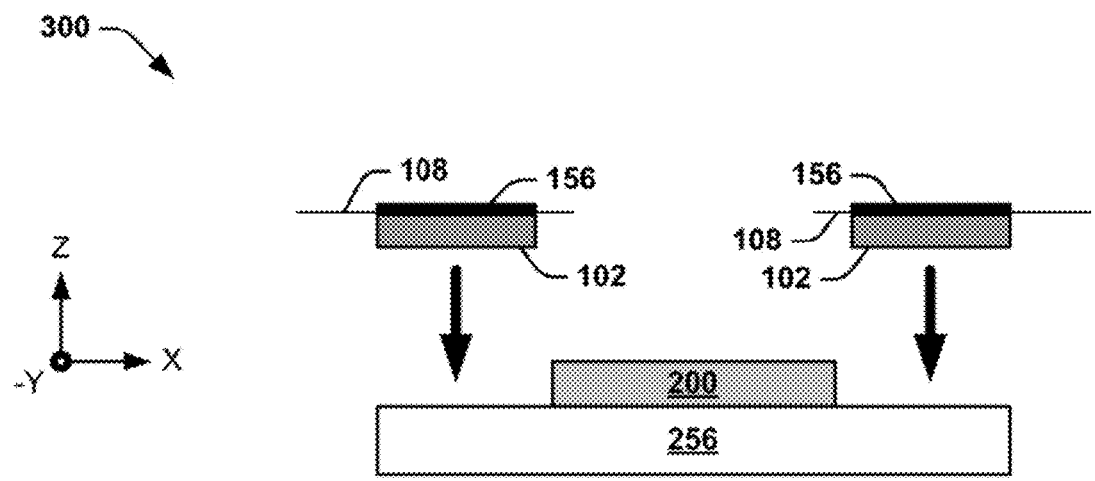
FIG. 7 illustrates a diagram of a step in fabricating an optical device package.

FIG. 7 illustrates a diagram 300 of a step in fabricating the optical device package 50. The diagram 300 demonstrates coupling of the optical fiber interface 150 with the optical system chip assembly 250 from a side view (e.g., at 154 in the example of FIG. 4 and at 254 in the example of FIG. 6). In the example of FIG. 7, the bottom surface of the first substrate 102 of the optical fiber interface 150 is bonded to the top surface of the second substrate 256 to couple the optical fiber interface 150 and the optical system chip assembly 252 to form the optical device package 50. As an example, the optical system chip assembly 250 can be raised into position relative to the optical fibers 108 to be provided through the opening defined by the inner periphery 104 of the optical fiber interface 150. Thus, upon the optical fibers 108 contacting the top surface of the optical system chip 200, the optical fibers 108 can be substantially concurrently aligned with the optical I/O of the optical system chip 200 via the channels 214.

For example, machine vision controlled alignment systems can be implemented to move and/or rotate the optical system chip assembly 250 and/or the optical fiber interface 150 on the X-Y axes as needed for positioning, to control the height of the optical system chip assembly 250 in the package, and/or to check that all fibers are properly aligned. Additionally, other ways can be implemented to provide Z-axis alignment of the optical system chip assembly 250 and/or the optical fiber interface 150. As a first example, an uncured epoxy may be used between the optical system chip assembly 250 and the optical fiber interface 150, allowing the final vertical position to be solely a function of the alignment equipment as facilitated by the gradual displacement of epoxy between the layers. As another example, an uncured epoxy in a fiberglass mat (e.g., a pre-preg) may be used between the optical system chip assembly 250 and the optical fiber interface 150, allowing the final vertical position to be solely a function of the alignment equipment as facilitated by the gradual displacement of epoxy between the layers. As yet another example, a fixed-thickness adhesive layer may be used, such as if manufacturing tolerances are sufficient to allow proper fiber angular alignment within a given range of the adhesive layer. Furthermore, other adhesives or mechanical fixation mechanisms, such as are able to accommodate the angular alignment of the optical fiber 108 to the optical system chip 200, can be implemented.

Figure 8:
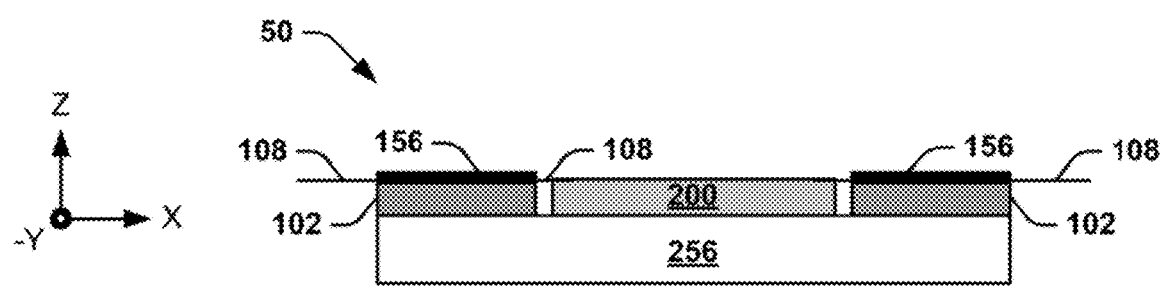
FIG. 8 illustrates another example of an optical device package.

FIG. 8 illustrates another example of the optical device package 50. The optical device package 50 is demonstrated in a side view relative to the example of FIG. 2, such as subsequent to the combining step demonstrated in the example of FIG. 7. Therefore, the optical device package 300 includes the optical fiber interface 150 and the optical system chip 200 that are each coupled to the second substrate 256. As described previously, upon the optical fibers 108 contacting the top surface of the optical system chip 200, the optical fibers 108 can be substantially concurrently aligned with the optical I/O of the optical system chip 200 via the channels 214 formed in the peripheral exposed surface of the chip 200 (see, e.g., FIG. 5).

In addition, subsequent to the combination of the optical fiber interface 150 with the optical system chip assembly 250, an index-matching adhesive can be applied over the optical fibers 108 on the top surface of the optical system chip 200. In this way, the optical fibers 108 can be secured within the channels 214 and the ends of the optical fibers 108 can be coupled to the respective optical ports 212 of the optical system chip 200. Therefore, if there is a gap between the optical ports 212 and the ends of the optical fibers 108, the optical I/O signals $OPT_{I/O1}$, $OPT_{I/O2}$, $OPT_{I/O3}$, and $OPT_{I/O4}$ can be provided to the optical ports 212 via the index-matching adhesive with minimal loss.

Furthermore, the top surface of the optical system chip 200 can be exposed in the finished optical device package 50. Accordingly, the top surface of the optical system chip 200 can accommodate one or more additional stacked die on the top surface of the optical system chip 200. For example, the additional stacked die(s) can be configured to provide additional optical and/or electronic functionality, such that the additional stacked die(s) can be in at least one of electrical and optical communication with the optical system chip 200. Additionally, the additional stacked die(s) can be underfilled to be properly bonded with the optical system chip 200. As another example, the top surface of the optical system chip 200 can remain open to accommodate one or more thermal cooling components, including heat slugs, package lids, heat sinks, heat pipes, water-cooled heat exchangers, TECs (Thermo-electric Coolers), and/or other thermal solutions.

Accordingly, as described herein, the resulting optical device package 50 can provide a number of advantages over typical optical device packages. As an example, the optical device package 50 allows multiple fibers to be simultaneously attached to a single die and for the epoxy attach to be cured in a single step, thus locking all optical fibers into a desired position and angle and protecting the optical fibers from individual damage in the optical device package 50. In addition, the optical device package 50 is capable of supporting high-volume manufacturing of chip-package-optics assemblies through mass fiber termination, and is capable of supporting a large number (tens to hundreds) of fibers to be attached simultaneously, as opposed to two or bundles of smaller numbers of fibers at a time as provided in typical optical package fabrication. Furthermore, the optical device package 50 allows a traditional top-side heat sink or heat pipe or water-cooled heat transfer mechanism to be attached to the optical system chip 200, as the top surface of the optical system chip 200 remains exposed after the optical fiber and electrical connections are provided.

Figure 9:
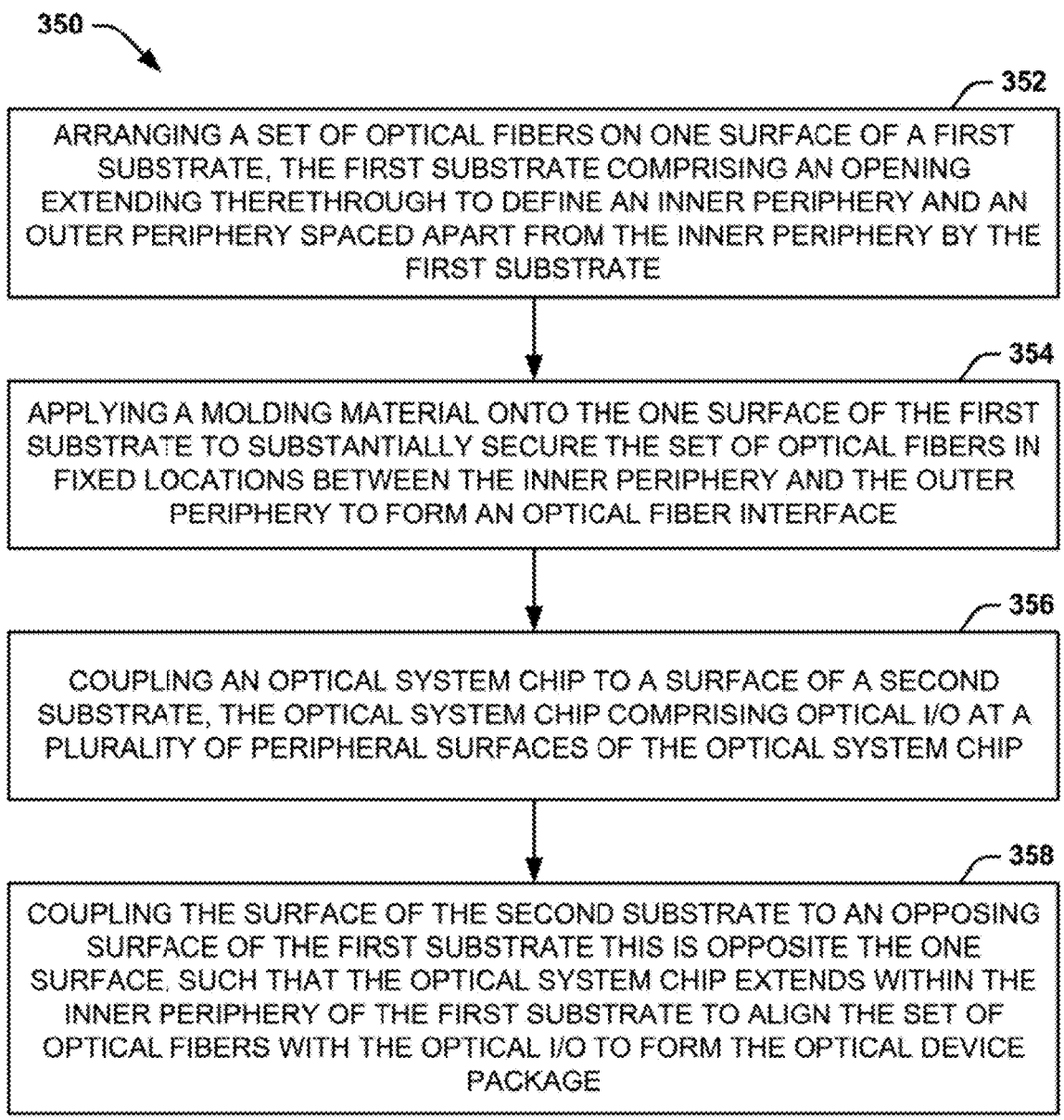
FIG. 9 illustrates an example of a method for fabricating an optical device package.

In view of the foregoing structural and functional features described above, an example method 300 that can be implemented will be better appreciated with reference to FIG. 9. While, for purposes of simplicity of explanation, the methodology of FIG. 9 are shown and described as executing serially, it is to be understood and appreciated that the method is not limited by the illustrated order, as some aspects could, in other embodiments, occur in different orders and/or concurrently with other aspects from that shown and described herein. Moreover, not all illustrated features may be required to implement the method 300.

FIG. 9 illustrates an example of a method 350 for fabricating an optical device package (e.g., the optical device package 50). At 352, a set of optical fibers (e.g., the optical fibers 108) is arranged on a top surface of a first substrate (e.g., the first substrate 102) comprising an inner periphery (e.g., the inner periphery 104) and an outer periphery (e.g., the outer periphery 106) in two dimensions. The set of optical fibers can extend between and beyond the inner periphery and the outer periphery at each of a plurality of orthogonal peripheral surfaces. At 354, a molding material (e.g., the molding material 156) is applied onto the top surface of the first substrate to substantially secure the set of optical fibers in fixed locations between the inner periphery and the outer periphery to form an optical fiber interface (e.g., the optical fiber interface 150). At 356, an optical system chip (e.g., the optical system chip 200) is coupled to a top surface of a second substrate (e.g., the second substrate 256), the optical device comprising optical I/O (e.g., the optical ports 212) at a plurality of peripheral surfaces of the optical system chip. At 358, a top surface of the second substrate is coupled to a bottom surface of the first substrate such that the optical system chip extends within the inner periphery of the optical system chip to substantially simultaneously align the set of optical fibers with the optical I/O to form the optical device package.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical fiber interface comprising:
   a first substrate comprising a pair of parallel opposing outer planar surfaces connected at an outer periphery by a plurality of outer lateral surfaces, the first substrate further comprising an opening extending through each surface of the pair of opposing surfaces and defining an inner periphery, one surface of the opposing surfaces of the first substrate being configured to be bonded to a given outer planar surface of a second substrate; and
   a set of optical fibers secured to the other opposing surface of the first substrate and extending inwardly from a plurality of surfaces of the inner periphery at fixed locations to align the set of optical fibers to optical inputs/outputs (I/O) of an optical system chip that is coupled to and disposed on the given surface of the second substrate and received through the opening.

2. The optical fiber interface of claim 1, wherein the set of optical fibers are arranged to extend between the inner periphery and the outer periphery on the opposing surface of the first substrate, the optical fiber interface further comprising a molding material that is disposed on the other opposing surface of the first substrate during a fabrication process to secure the set of optical fibers in a fixed location between the inner periphery and the outer periphery.

3. The optical fiber interface of claim 2, wherein the set of optical fibers is arranged such that a lateral spacing between adjacent pairs of optical fibers is greater at the outer periphery relative to the inner periphery.

4. The optical fiber interface of claim 1, wherein the plurality of optical fibers extend inward from each of four orthogonal peripheral surfaces of the inner periphery of the optical fiber interface package to align the set of optical fibers to the optical I/O of the optical system chip.

5. An optical package device comprising the optical fiber interface of claim 1 and the optical system chip that are each coupled to the given surface of the second substrate.

6. The device of claim 5, wherein the optical system chip is coupled to the given surface of the second substrate via a first of opposing surfaces, the optical package device comprising a thermal cooling component or an additional stacked die coupled to an exposed second surface of the opposing surfaces of the optical system chip in at least one of thermal contact, electrical communication, or optical communication with the optical system chip.

7. The device of claim 5, wherein the optical system chip comprises a plurality of channels to receive and substantially align the set of optical fibers, each channel being associated with a respective optical I/O and located at each of a plurality of peripheral surfaces of the optical system chip, the plurality of channels being formed at an exposed surface of the optical system chip to extend from the plurality of peripheral edges of the optical system chip to terminate at respective optical I/Os.

8. The device of claim 7, further comprising an index-matching adhesive that is disposed over the set of optical fibers to secure the set of optical fibers to the channels and to interconnect ends of the optical fibers to the respective optical I/O.

9. A method for fabricating an optical device package, the method comprising:
arranging a set of optical fibers on a first outer planar surface of a first substrate including the first outer planar surface and a second outer planar surface parallel to and opposing the first outer planar surface and connected to the first outer planar surface at an outer periphery by a plurality of outer lateral surfaces, the first substrate comprising an opening extending through the first and second surfaces and defining an inner periphery spaced apart from the outer periphery of the first substrate, the set of optical fibers extending from locations inwardly spaced from the inner periphery to locations that are beyond the outer periphery at each of a plurality of orthogonal peripheral edges of the outer periphery;
applying a molding material onto the first surface of the first substrate to substantially secure the set of optical fibers in fixed locations between the inner periphery and the outer periphery to form an optical fiber interface;
coupling an optical system chip to a planar outer surface of a second substrate, the optical system chip disposed on the surface of the second substrate, and the optical system chip comprising optical I/O at a plurality of peripheral surfaces of the optical system chip; and
coupling the planar outer surface of the second substrate to the second surface of the first substrate, such that the optical system chip is disposed within the opening and extends within the inner periphery of the first substrate to align the set of optical fibers with the optical I/O to form the optical device package.

10. The method of claim 9, further comprising forming a plurality of channels associated with a respective optical I/O at each of the plurality of peripheral surfaces on a top surface of the optical system chip to extend from the respective plurality of peripheral surfaces to the respective optical I/O, wherein coupling the surface of the second substrate to the second surface of the first substrate further comprises coupling the surface of the second substrate to the second surface of the first substrate such that the set of optical fibers are received in the plurality of channels to substantially simultaneously align the set of optical fibers with the optical I/O.

11. The method of claim 10, further comprising applying an index-matching adhesive over the set of optical fibers to secure the set of optical fibers with respect to the plurality of channels and to interconnect ends of the optical fibers to the respective optical I/O.

12. The method of claim 9, wherein arranging the set of optical fibers on the first surface of the first substrate comprises arranging the set of optical fibers to extend inward from each of a plurality of orthogonal peripheral surfaces of the inner periphery of the optical fiber interface package a predetermined distance to align the set of optical fibers to the optical I/O of the optical system chip on each orthogonal peripheral surface of the optical system chip.

13. The method of claim 9, further comprising coupling wherein the optical system chip is coupled to the surface of the second substrate via a first of opposing surfaces, the optical package device comprising a thermal cooling component or an additional stacked die coupled to an exposed second surface of the opposing surfaces of the optical system chip in at least one of thermal contact, electrical communication, or optical communication with the optical system chip.

14. The method of claim 9, further comprising stripping, cleaning, and polishing the set of optical fibers that extend beyond the inner periphery at each of a plurality of orthogonal peripheral surfaces of the optical fiber interface to extend from the inner periphery a substantially equal length at each of a plurality of orthogonal peripheral surfaces of the optical fiber interface.

15. The method of claim 9, wherein the set of optical fibers is arranged such that a lateral spacing between adjacent pairs of optical fibers is greater at each of the plurality of orthogonal peripheral edges of the outer periphery relative to corresponding edges of the inner periphery.

16. An optical device package comprising:
an optical system chip that is bonded to and disposed on an outer planar surface of a first substrate via a first surface of the optical system chip and is configured to at least one of transmit and receive a plurality of optical signals via a set of optical fibers that are coupled to the optical system chip via optical inputs/outputs (I/O) via a plurality of channels associated with the optical I/O and which are fabricated on a second surface of the optical system chip opposite the first surface of the optical system chip, the plurality of channels extending from each of a plurality of orthogonal peripheral surfaces to the respective optical I/O to receive and substantially align the set of optical fibers to the respective plurality of the optical I/O; and
an optical fiber interface that is bonded to the outer planar surface of the first substrate and substantially surrounds the pluralities of first and second orthogonal peripheral surfaces, the optical fiber interface comprising:

a second substrate comprising a pair of parallel opposing outer planar surfaces connected at an outer periphery by a plurality of outer lateral surfaces and an opening extending through each surface of the opposing surfaces and defining an inner periphery spaced apart from the outer periphery of the second substrate, the set of optical fibers arranged on a first surface of the pair of opposing surfaces and extending from locations inwardly spaced from the inner periphery to locations that are beyond the outer periphery at each of a plurality of orthogonal peripheral edges of the outer periphery, the second substrate being bonded to the first substrate via a second surface opposite the first surface of the second substrate, and the optical system chip disposed within the opening; and a molding material that is disposed on the first surface of the second substrate during a fabrication process to secure the set of optical fibers in a fixed location between the inner periphery and the outer periphery.

17. The device of claim 16, further comprising an index-matching adhesive that is disposed over the set of optical fibers to secure the set of optical fibers to the channels and to interconnect ends of the optical fibers to the respective optical I/O.

18. The optical device package of claim 16, further comprising:

the first substrate to which the optical system chip and the second substrate are bonded; and the set of optical fibers affixed to the second substrate.

19. The optical device package of claim 16, wherein:

the plurality of orthogonal peripheral edges of the outer periphery comprises four orthogonal peripheral edges;

the set of optical fibers extends from each of four orthogonal peripheral surfaces of the inner periphery to beyond the four orthogonal peripheral edges of the outer periphery; and the set of optical fibers is arranged such that a lateral spacing between adjacent pairs of optical fibers is greater at the outer periphery relative to the inner periphery.

20. The optical device package of claim 16, further comprising a thermal cooling component or an additional stacked die coupled to an exposed surface of the optical system chip in at least one of thermal contact, electrical communication, or optical communication with the optical system chip.

* * * * *